US012665735B2

(12) United States Patent
Bailey et al.

(10) Patent No.: US 12,665,735 B2
(45) **Date of Patent: *Jun. 23, 2026**

(54) WIRELESS OVER CABLE COMMUNICATION SYSTEM

(71) Applicant: PPC BROADBAND, INC., East Syracuse, NY (US)

(72) Inventors: Paul Bailey, Camillus, NY (US); Yan Li, Syracuse, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/962,152

(22) Filed: Nov. 27, 2024

(65) Prior Publication Data

US 2025/0097001 A1      Mar. 20, 2025

Related U.S. Application Data

(63) Continuation of application No. 18/217,276, filed on Jun. 30, 2023, now Pat. No. 12,177,170, which is a
(Continued)

(51) Int. Cl.
*H04L 5/16*          (2006.01)
*H04L 49/25*         (2022.01)
(Continued)

(52) U.S. Cl.
CPC ................ *H04L 5/16* (2013.01); *H04L 49/25* (2013.01); *H04N 21/43637* (2013.01);
(Continued)

(58) Field of Classification Search
CPC ......... H04L 5/16; H04L 49/25; H04L 12/189; H04N 21/43637; H04N 21/6118;
(Continued)

(56) References Cited

U.S. PATENT DOCUMENTS 5,235,619 A    8/1993  Beyers et al.
6,588,017 B1   7/2003  Calderone
(Continued)

FOREIGN PATENT DOCUMENTS

CN         2829256 Y    10/2006
CN      201048432 Y     4/2008
(Continued)

OTHER PUBLICATIONS

Canadian Office Action mailed in CA 3,133,623 on Apr. 16, 2025 (4 pages).
(Continued)

*Primary Examiner* — Vinncelas Louis
(74) *Attorney, Agent, or Firm* — MH2 Technology Law Group, LLP

(57) ABSTRACT

A system for communicating wireless signals over a cable network includes a wireless over cable (WoC) amplifier configured to communicate wireless frequency band signals with a modem. The system may also include a WoC splitter configured to communicate the wireless frequency band signals with the WoC amplifier directly or via one or more cables, and a WoC adapter configured to receive the wireless frequency band signals from the WoC splitter via one or more cables and transmit the wireless frequency band signals wirelessly to one or more wireless communication devices.

15 Claims, 12 Drawing Sheets

Related U.S. Application Data continuation of application No. 17/397,086, filed on Aug. 9, 2021, now Pat. No. 11,728,960, which is a continuation of application No. 16/823,447, filed on Mar. 19, 2020, now Pat. No. 11,088,814.

(60) Provisional application No. 62/820,508, filed on Mar. 19, 2019.

(51) Int. Cl.
   *H04N 21/4363*     (2011.01)
   *H04N 21/61*      (2011.01)
   *H04L 12/18*      (2006.01)

(52) U.S. Cl.
   CPC ..... *H04N 21/6118* (2013.01); *H04N 21/6168* (2013.01); *H04L 12/189* (2013.01)

(58) Field of Classification Search
   CPC ... H04N 21/6168; H04N 7/106; H04W 88/14; H03H 7/482
   See application file for complete search history.

(56)                References Cited

U.S. PATENT DOCUMENTS

| | | | |
|---|---|---|---|
| 2004/0139477 | A1 | 7/2004 | Russell et al. |
| 2012/0066724 | A1 | 3/2012 | Zussman |
| 2013/0070772 | A1* | 3/2013 | Watson ................. H04W 88/14 |
| | | | 370/400 |
| 2014/0199994 | A1 | 7/2014 | Wolcott et al. |
| 2018/0205910 | A1* | 7/2018 | Li ........................... H03H 7/482 |
| 2020/0260153 | A1 | 8/2020 | Li |

FOREIGN PATENT DOCUMENTS

| | | | |
|---|---|---|---|
| CN | 101461150 | A | 6/2009 |
| CN | 101568005 | A | 10/2009 |
| CN | 203554685 | U | 4/2014 |
| CN | 205610848 | U | 9/2016 |
| CN | 106161159 | A | 11/2016 |
| CN | 106329072 | A | 1/2017 |
| JP | H10336614 | A | 12/1998 |
| WO | 0233969 | A1 | 4/2002 |
| WO | 2004015902 | A2 | 2/2004 |
| WO | 2005072356 | A2 | 8/2005 |

OTHER PUBLICATIONS

International Search Report and Written Opinion dated Jun. 9, 2020, PCT Application No. PCT/US2020/023499, pp. 1-13.

* cited by examiner 700
702
704

700
702
704

110
702
700
H_75 / 50
705

700
110
WoC
705
75 / 50
702

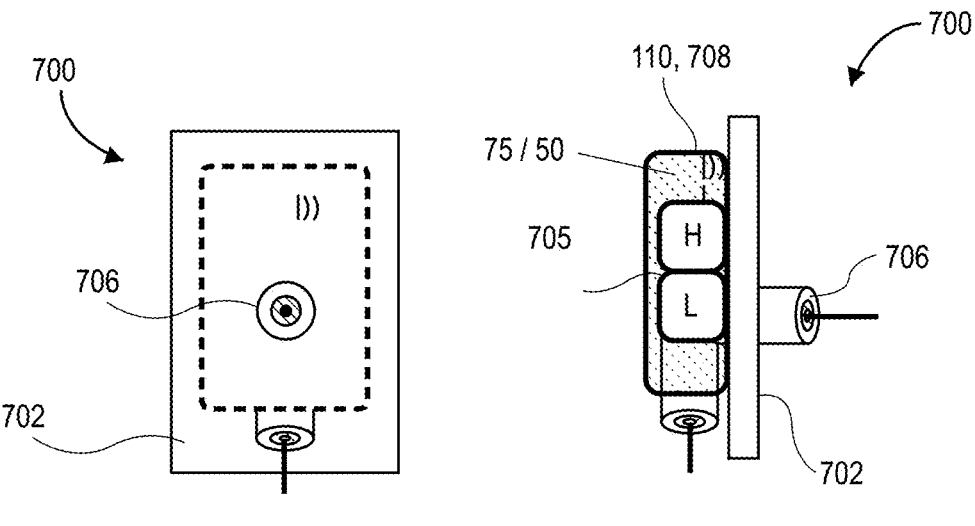
FIG. 9A          FIG. 9B
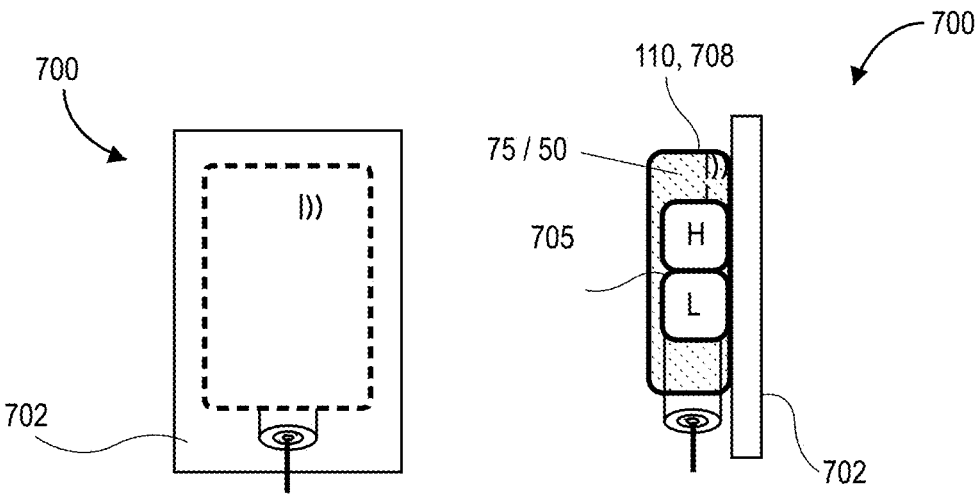
FIG. 10A          FIG. 10B

WIRELESS OVER CABLE COMMUNICATION SYSTEM

CROSS-REFERENCE TO RELATED APPLICATIONS

This application is a continuation of U.S. application Ser. No. 18/217,276, filed on Jun. 30, 2023, which is continuation of U.S. patent application Ser. No. 17/397,086, filed on Aug. 9, 2021, now U.S. Pat. No. 11,728,960, which is a continuation of U.S. patent application Ser. No. 16/823,447, filed on Mar. 19, 2020, now U.S. Pat. No. 11,088,814, which claims priority to U.S. Provisional Patent Application Ser. No. 62/820,508 which was filed on Mar. 19, 2019. The entirety of these applications is incorporated by reference herein.

BACKGROUND

Communications within a residential or commercial network are generally wired or wireless, both of which have advantages and drawbacks with respect to the other. For example, wired communication is often faster and more reliable, while wireless communication provides ease of use, mobility, and fewer wires, but often at the cost of speed and reliability.

Further, in order to extend wireless networks, repeaters and access points are often used. Both repeaters and access points require a power source to operate. Repeaters produce a second network with a second service set identifier (SSID). To use the repeater, client devices have to connect to the second network. In the subscriber's premises, the repeater is in one geographic location and overlaps the first network; further, repeaters operate in half-duplex mode (or waiting to listen before re-transmitting signals) effectively cutting data rate in half.

Moreover, to maximize range, the repeaters are often positioned at the outer extent of the effectiveness of the wireless network established by the primary router. However, this is typically a point where packet-dropping is problematic due to signal weakness and interference from obstacles or other wireless signal congestion, forcing the user device to retransmit signals and resulting in reduced bandwidth and slow communication speeds. Access points branch out in one direction from the source router and similarly operate in half duplex which halves the communication speed or bandwidth.

SUMMARY

A system for communicating wireless frequency band signals over a cable network includes a wireless over cable (WoC) amplifier configured to communicate wireless frequency band signals to and from a modem, the modem being connected to an internet service provider network. The WoC amplifier includes an antenna in wireless communication with the modem, a wireless signal amplifier electrically connected with the antenna, an impedance transformer electrically connected with the wireless signal amplifier, and an output port. The system also includes a WoC splitter including an input port configured to communicate external network signals with the internet service provider network, a frequency band separation device configured to separate the wireless frequency band signals from the external network signals, and at least one integrated port electrically connected to the frequency band separation device and the WoC amplifier. The at least one integrated port is electrically connected to the output port of the WoC amplifier directly or by one or more cables. The WoC splitter also includes a plurality of wireless frequency ports electrically connected to the frequency band separation device. The frequency band separation device is configured to transmit the wireless frequency band signals from the WoC amplifier to the wireless frequency ports, transmit the external network signals from the input port to the integrated port, block the wireless frequency band signals from being transmitted from the wireless frequency ports to the input port, and block the external network signals from being transmitted from the input port to the wireless frequency ports. The system further includes a WoC adapter electrically connected to the WoC splitter via one or more coaxial cables, wherein the WoC adapter is configured to receive the wireless frequency band signals from the WoC splitter and transmit the wireless frequency band signals wirelessly to one or more wireless communication devices.

A system for communicating wireless signals over a cable network includes a wireless over cable (WoC) amplifier configured to communicate wireless frequency band signals with a modem, the modem being configured to communicate external network signals with an external network, and a WoC splitter electrically connected to the WoC amplifier directly or via one or more first cables. The WoC splitter is configured to communicate the wireless frequency band signals with the WoC amplifier directly or via the one or more first cables. The system also includes a WoC adapter electrically connected to the WoC splitter via one or more second cables. The WoC adapter is configured to receive the wireless frequency band signals from the WoC splitter via the one or more second cables, and transmit the wireless frequency band signals wirelessly to one or more wireless communication devices.

A system for communicating wireless signals over a cable network includes a splitter for a wireless over coaxial (WoC) communication system, the splitter including an external network port configured to be connected to an external network and communicate external network signals therewith, an integrated port configured to be connected to a WoC amplifier directly or via a cable and to communicate wireless frequency band signals and the external network signals therewith directly or via the cable, a plurality of wireless frequency ports configured to communicate the wireless frequency band signals with one or more WoC adapters each comprising an antenna, and a frequency band separation device coupled to the external network port and the wireless frequency ports. The frequency band separation device is configured to separate the wireless frequency band signals from the external network signals, transmit the wireless frequency band signals between the integrated port and the wireless frequency ports, transmit the external network signals between the external network port and the integrated port, block the external network signals from transmitted between the external network port and the wireless frequency ports, and block the wireless frequency band signals from being transmitted from the wireless frequency ports to the external network port.

BRIEF DESCRIPTION OF THE DRAWINGS

FIGS. 9A and 9B illustrate the wireless over cable adapter assembly, according to another embodiment.

FIGS. 10A and 10B illustrate the wireless over cable adapter assembly, according to another embodiment.

DETAILED DESCRIPTION

Figure 1:
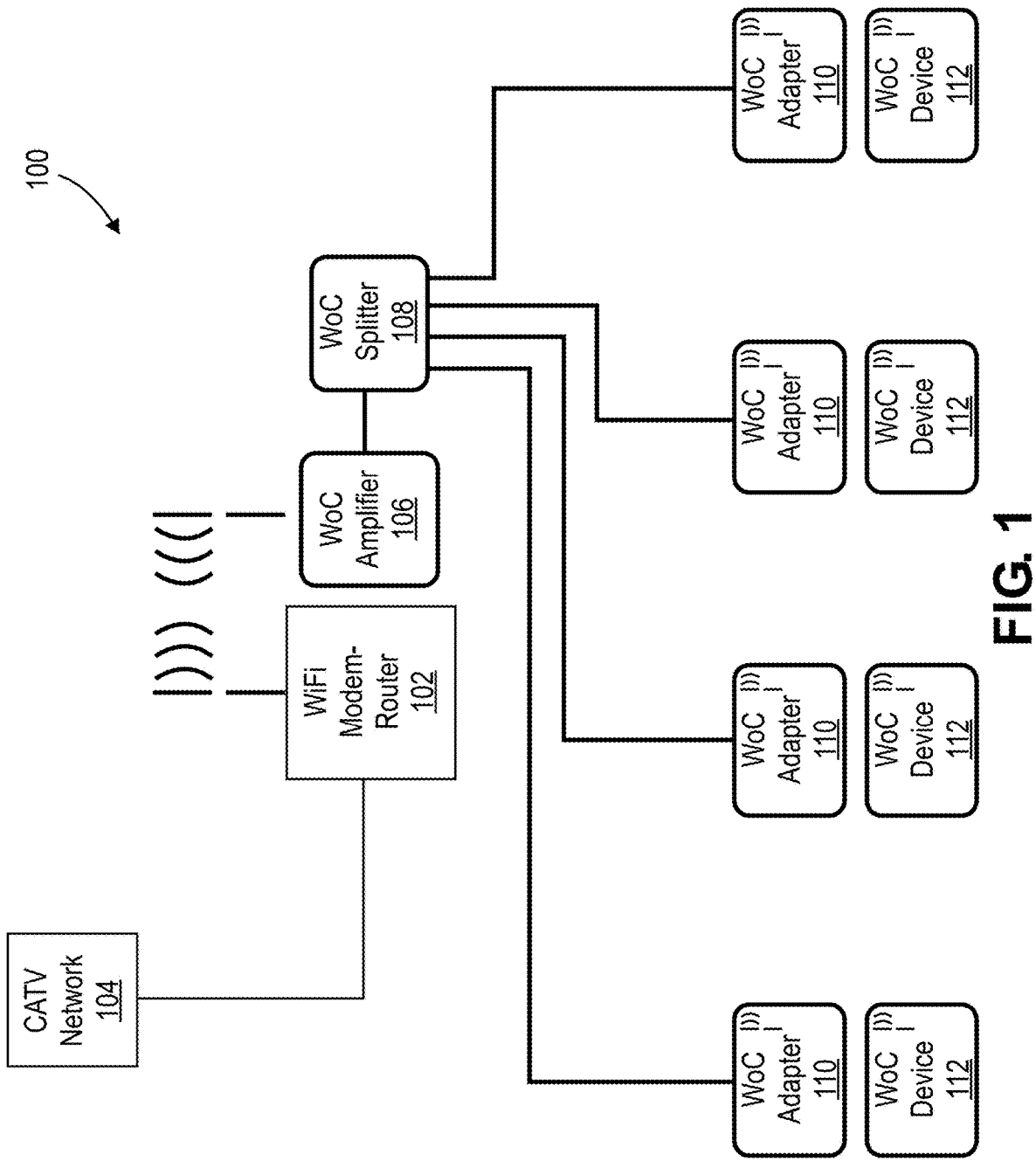
FIG. 1 illustrates a schematic view of a wireless over cable communication system, according to an embodiment.

Certain embodiments of the disclosure will hereafter be described with reference to the accompanying drawings, wherein like reference numerals denote like elements. It should be understood, however, that the accompanying drawings illustrate only the various implementations described herein and are not meant to limit the scope of various technologies described herein. The drawings show and describe various embodiments of the current disclosure.

Embodiments of the present disclosure may provide a wireless (e.g., WIFI®) over cable ("WoC") network or system that includes a mesh distribution architecture, which provides economical and reliable extension of wireless communication (e.g., WIFI) signals, while maintaining a single SSID and security credentials. The WoC network may begin at the premises modem or wireless router (or another source) using a WoC amplifier for connection to an (e.g., pre-existing) in-home coaxial cable network (or wired back haul). The cable network may also include one or more WoC splitters, which may be configured for use in wireless frequency bands such as 2.4 GHz and/or 5 GHz (it will be appreciated that any suitable wireless frequency band may be employed, and the two listed are not to be considered exclusive). The wireless frequency band signals are distributed to any number of end points via an existing cable network. The end points, in turn, may be wall plates attached to a wall, which may include or have connected thereto a WoC adapter, which may transmit the wireless frequency band signals wirelessly via an antenna and receive wireless signals from connected devices.

The WoC system may thus represent an advancement over conventional WIFI mesh networks, extenders, and Ethernet over coaxial communications (e.g., multi-media over coaxial alliance or MoCA protocol communications). For example, the WoC system may be simpler in setup and use, less expensive per coverage area, maintain network security, management, SSID and password, require power at only one location, have a reliable low loss path around or through premise structures, and have minimal delay (or latency). Thus, the wireless over cable network may provide a solution for high bandwidth, low-latency required applications, such as gaming and video streaming.

FIG. 1 illustrates a schematic view of a WoC system 100, according to an embodiment. The WoC system 100 generally includes a wireless modem-router (hereinafter, referred to simply as a modem) 102, which is configured to be connected to a cable television (CATV) network or another type of internet service provider (ISP). One or more other routers, access points, entry adapters, etc., may be interposed between the CATV network 104 and the modem 102. The modem 102 may be configured to communicate external network signals with the CATV network 104, e.g., in a frequency between about 5 MHz and about 1002 MHz. Although the external network signals may sometimes be described herein as CATV signals, it will be appreciated that the external network signals may be DOCSIS signals, Ethernet signals, or any other suitable signal frequency or protocol for use with any network.

A WoC amplifier 106 may be in communication with the modem 102. For example, the WoC amplifier 106 may be in wireless communication with the modem 102, e.g., using an antenna in communication with the antenna of the modem 102. The WoC amplifier 106 and the modem 102 may be closely proximal to one another, which may promote high reliability and low latency wireless communication therebetween. In another embodiment, the modem 102 and the WoC amplifier 106 may each have a wired communication (e.g., coaxial) port, and the modem 102 and the WoC amplifier 106 may be in wired communication with one another via a cable extending between the ports thereof. Furthermore, the communication between the WoC amplifier 106 and the router 102 may be in a wireless frequency band, e.g., 2.4-2.5 GHz or 5.0 GHz, or the like. Thus, as the term is used herein, "wireless frequency band signals" refers to signals in a wireless frequency band (e.g., wireless frequency band signals such as 2.4-2.5 GHz or 5.0 GHz), and it will be appreciated that such signals may be communicated between devices wirelessly and/or via coaxial (or other types of) cables for transmission within the wired backbone.

The system 100 may also include a WoC splitter 108, which may be in communication with the WoC amplifier 106 via a coaxial cable or another type of cable suitable for transmitting wireless frequency band signals. The WoC splitter 108 may be configured to split downstream signals from the WoC amplifier 106 into two or more legs, and provide upstream signals to the WoC amplifier 106. In some embodiments, the WoC splitter 108 may be a passive device, receiving power only through the wireless frequency band signals (or any other frequency signals) sent thereto for communication to other devices.

The system 100 may also include a plurality of WoC adapters 110 (four are shown by way of example). The WoC adapters 100 may be configured to receive downstream signals from the WoC splitter 108 and transmit the downstream signals wirelessly to one or more wireless communication devices 112 (four shown) in proximity thereto. The WoC adapters 110 may also be configured to receive upstream signals from the wireless communication devices 112 and transmit the upstream signals to the WoC amplifier 106. The WoC amplifier 106 may then transmit (e.g., wirelessly) the wireless frequency band signals to the modem 102, which may convert the wireless frequency signals to external network signals (e.g., CATV), and communicate the signals to the CATV network 104. It will be appreciated that a single WoC adapter 110 may be configured to communicate with multiple wireless communication devices 112.

Figure 2:
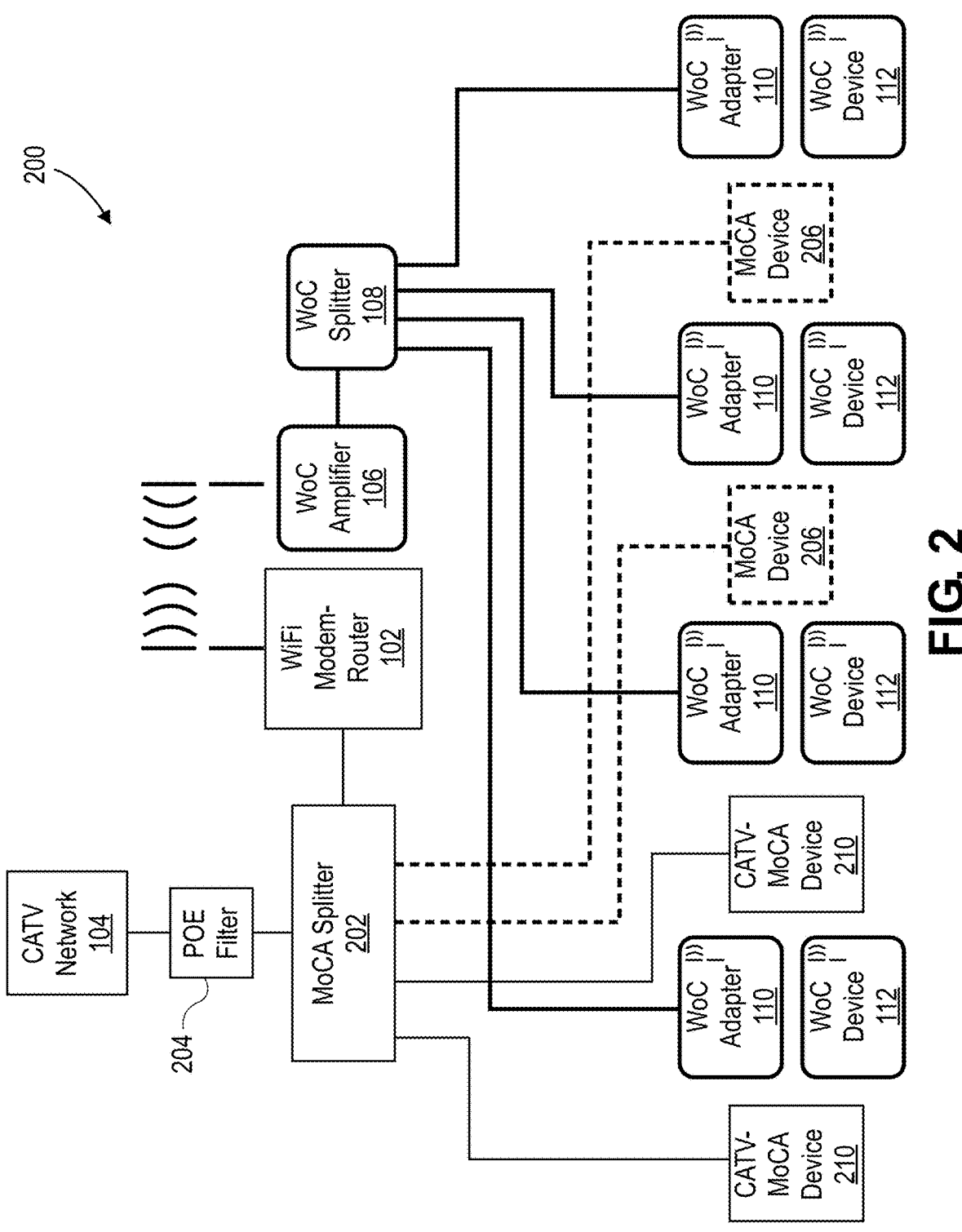
FIG. 2 illustrates a schematic view of another wireless over cable communication system, according to an embodiment.

FIG. 2 illustrates another WoC system 200, according to an embodiment. The WoC system 200 may be configured to transmit not only wireless frequency band signals, but also Multimedia over Coaxial Alliance (MoCA) signals to the appropriate devices. In some embodiments, MoCA signals may be in a frequency ranging from 1125 MHz to 1675 MHz, which may be outside of the frequency band of either wireless or external network communication signals. As such, MoCA signals are provided to enable communication between MoCA devices over coaxial cables, even in the presence of external network frequency band signals. Thus, MoCA signals have a different frequency than the external network (e.g., CATV) signals. The precise frequency range of the MoCA signals may be adjusted as desired.

As mentioned above, the system 200 may be configured to distribute wireless frequency band signals, which, again, are those signals in a wireless frequency band (which may be different from both the MoCA frequency band and the CATV frequency band). Accordingly, the WoC system 200 may include the modem 102, the WoC amplifier 106, the WoC splitter 108, and the WoC adapters 110, which are configured to communicate wirelessly with wireless communication devices 112. The WoC components may be configured as discussed above with reference to FIG. 1.

In addition, between the CATV network 104 and the modem 102, there may be a MoCA splitter (e.g., an entry adapter) 202 along with a point-of-entry (POE) filter 204. The MoCA splitter 202 may be configured to separate (e.g., passively or actively) CATV frequency band signals from MoCA frequency band signals. The MoCA splitter 202 may further be configured to communicate MoCA signals among MoCA devices 206 (two shown) and CATV-MoCA devices 210 (two shown), while allowing the CATV signals to/from only the CATV-MoCA devices 210 and preventing CATV signals from reaching the MoCA devices 206. The POE filter 204 may be configured to block MoCA frequency band signals from exiting the system 200 and being received back to the CATV network 104. In an embodiment, the MoCA splitter 202 may also communicate the CATV signals, but not the MoCA signals, to the modem 102 for transmission via the WoC amplifier 106 to the WoC splitter 108 and then to the WoC adapters 110.

Figure 3:
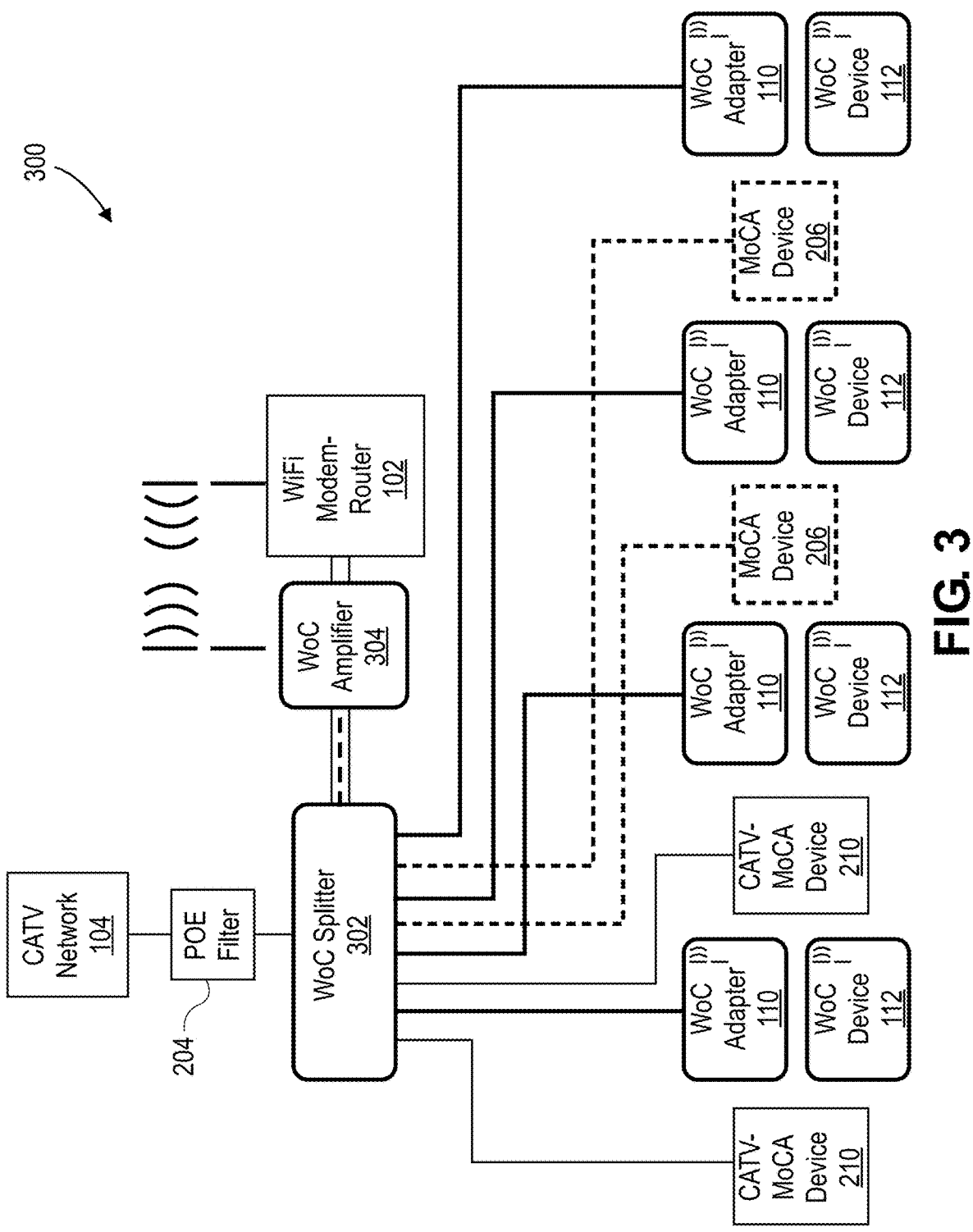
FIG. 3 illustrates a schematic view of another wireless over cable communication system, according to an embodiment.

FIG. 3 illustrates another WoC system 300, according to an embodiment. In this embodiment, the separate MoCA splitter 202 of FIG. 2 is replaced by a WoC splitter 302. Further, the system 300 includes a WoC amplifier 304 which is connected to the WoC splitter 302 and the modem 102 via cable (e.g., coaxial cable) connections, in addition to being in wireless communication with the modem 102.

The WoC splitter 302 may be configured to separate CATV signals, MoCA signals, and wireless frequency band signals, e.g., based on the different frequency bands thereof, as will be described in greater detail below. The WoC splitter 302 may thus provide the same functionality as the MoCA splitter 202, with the addition of handling distribution and receipt of wireless frequency band signals.

Accordingly, the WoC splitter 302 may receive downstream CATV signals from the CATV network 104 via the POE filter 204. The WoC splitter 302 may pass these downstream CATV signals to the CATV-MoCA (or CATV-only) devices 210, as well as to the WoC amplifier 304. The WoC amplifier 304 may pass the downstream CATV signals to the modem 102, e.g., directly or via a coaxial cable forming a wired connection. The modem 102 may then transmit the wireless frequency band signals via one or more wireless links (i.e., "wirelessly") back to the WoC amplifier 304. The WoC amplifier 304 may transmit the wireless frequency band signals to the WoC splitter 302 directly or via a wired connection. The WoC splitter 302 may distribute the signals to the WoC adapters 110.

The WoC splitter 302 may also communicate MoCA signals between the CATV-MoCA devices 210 and the MoCA-only devices 206. The WoC splitter 302 may prevent at least some of the upstream MoCA signals from reaching the CATV network 104, and the POE filter 104 may also prevent the upstream MoCA (and/or wireless frequency band) signals from reaching the CATV network 104. In addition, the WoC splitter 302 may receive upstream WoC signals from the WoC adapter 110 (received from the wireless communication devices 112). The WoC splitter 302 may route these upstream wireless frequency band signals to the WoC amplifier 304. The WoC amplifier 304 may wirelessly transmit the wireless frequency band signals to the modem 102, which may receive the wireless frequency band signals, adjust the frequency thereof into the CATV frequency band, and return them to WoC splitter 302 (e.g., via the WoC amplifier 106) directly or through a coaxial cable connection. The WoC splitter 302 may then route the external network (CATV) signals back to the CATV network 104 directly or via the POE filter 204, e.g., via coaxial cable.

Figure 4:
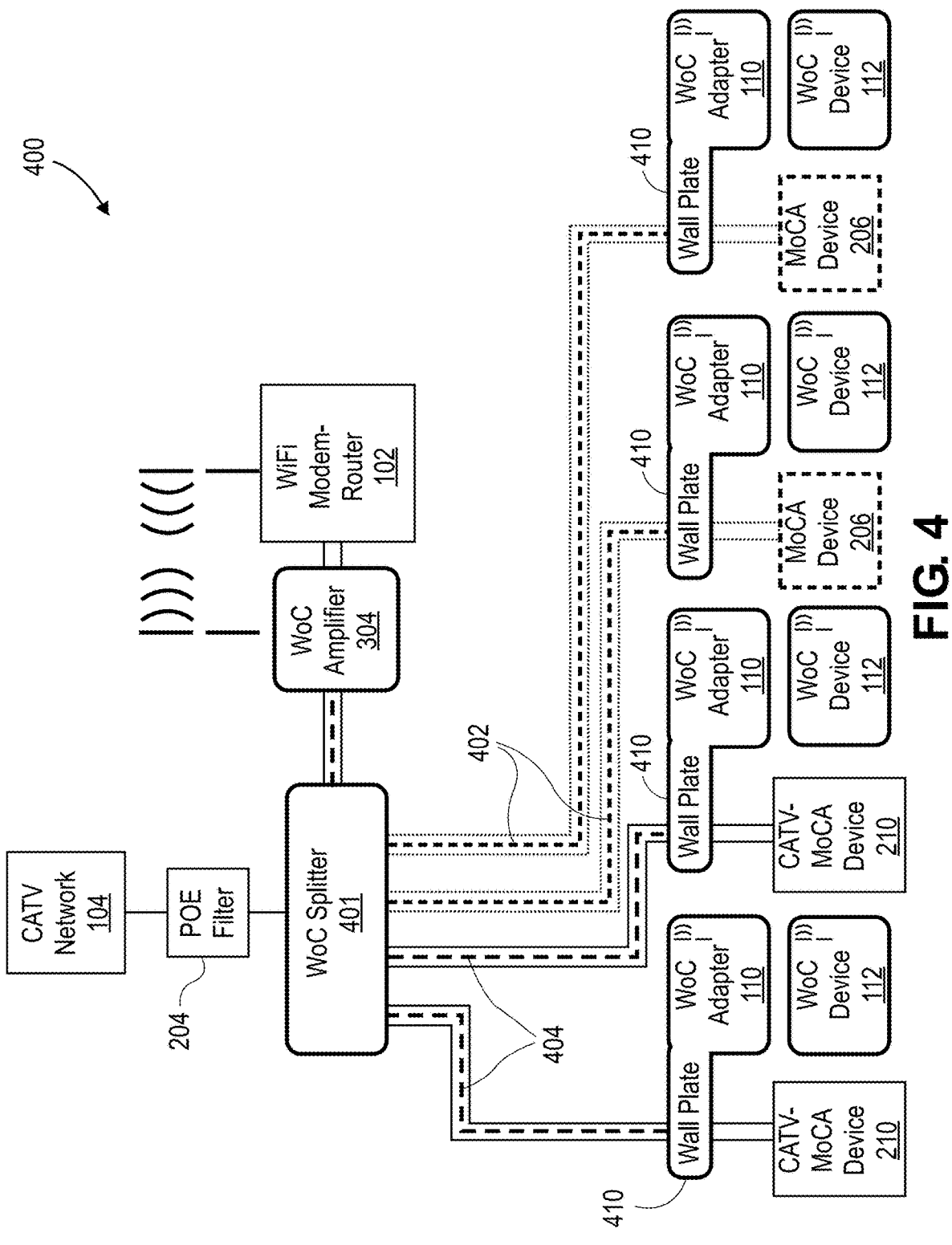
FIG. 4 illustrates a schematic view of another wireless over cable communication system, according to an embodiment.

FIG. 4 illustrates another WoC system 400, according to an embodiment. The WoC system 400 may operate similarly to the WoC system 300, including use of a WoC splitter 401, which may operate similarly to the WoC splitter 302 discussed above with reference to FIG. 3. In this embodiment, however, the WoC splitter 401 may be configured to communicate both wireless frequency band and MoCA signals along one or more integrated signal communication lines 402 (two shown) and wireless frequency band, CATV, and MoCA signals along one or more other integrated signal communication lines 404 (two shown). In this embodiment, the system 400 may include wall plates 410 (four shown), each connected to one of the integrated lines 402, 404. The wall plates 410 may be configured to separate the different types of signals.

The WoC adapters 110 may thus be connected to respective wall plates 410, and receive wireless frequency band signals therefrom, which the WoC adapters 110 may in turn transmit wirelessly to nearby wireless communication devices 112. Similarly, the CATV-MoCA devices and MoCA-only devices may be coupled (e.g., via cable connections) to the wall plates 410, and may receive either MoCA-only signals or combined CATV and MoCA signals therefrom. The wall plates 410 may also be configured to handle upstream communications in the same frequency bands.

Figure 5A:
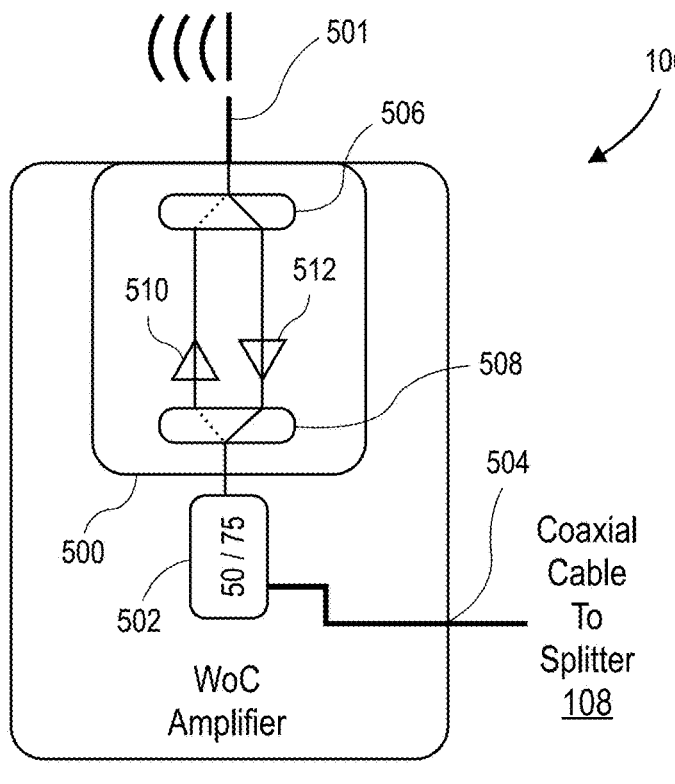
FIGS. 5A and 5B each illustrate a schematic view of a wireless over cable amplifier, according to two embodiments.

FIG. 5A illustrates a schematic view of the WoC amplifier 106, according to an embodiment. The WoC amplifier 106 of FIG. 5A may be configured for use in the systems 100, 200 of FIGS. 1 and 2.

As shown, the WoC amplifier 106 may include a wireless signal amplifier 500, an antenna 501, and an impedance transformer 502. The antenna 501 may be configured to communicate with the modem 102 (e.g., FIGS. 1 and 2), wirelessly, so as to send and receive wireless frequency band signals thereto and therefrom. The wireless signal amplifier 500 may include switches 506, 508, an upstream amplifier 510, and a downstream amplifier 512. The switches 506, 508 may be configured to route signals to/from the appropriate amplifier 510, 512 based on the direction of the signal.

Further, the impedance transformer 502 may be coupled to an output port 504, which may be configured to bidirectionally communicate with the WoC splitter 108 (e.g., FIGS. 1-4) via coaxial cable using wireless frequency band signals. The wireless signal amplifier 500 overcomes or compensates for the losses incurred when the WIFI signal passes through the cable and other passive components. The impedance transformer 502 is included because the WIFI elements (antenna, amplifiers) may have a 50 ohm impedance where the coaxial cable used in "cable television" has an impedance of 75 ohms. The impedance transformer 50 thus avoids reflections causing loss of power when moving between different types of signal transmission components (CATV to WIFI and back).

Figure 5B:
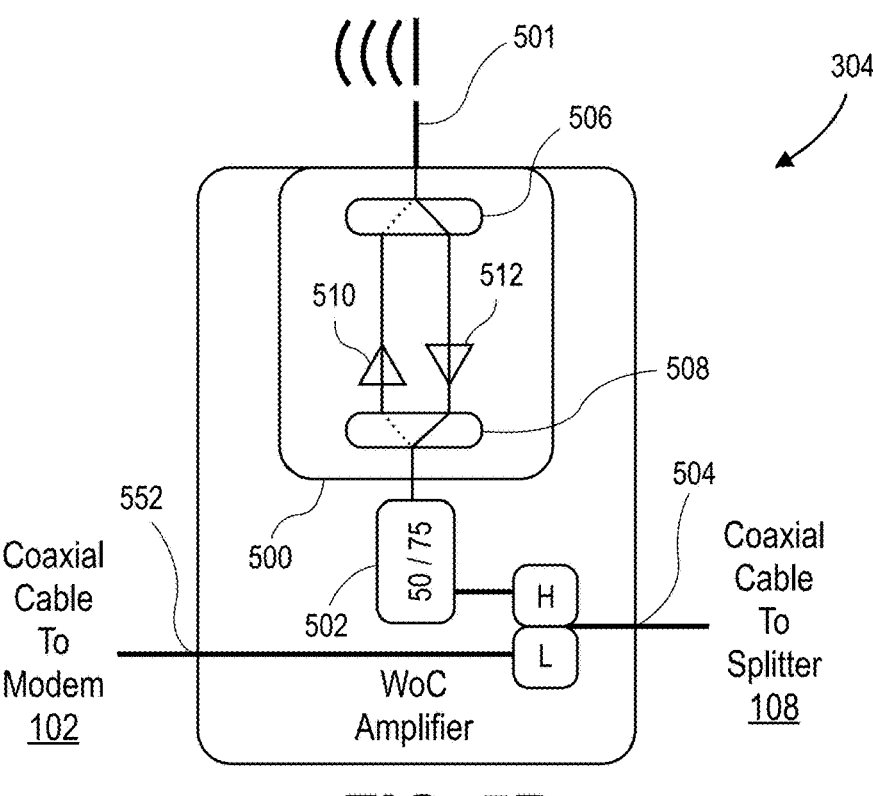

FIG. 5B illustrates a schematic view the WoC amplifier 304, according to an embodiment, e.g., specifically for use in the systems 300, 400 discussed above with reference to FIGS. 3 and 4, including the wired connection between the WoC amplifier 304 and the modem 102. As shown, the WoC amplifier 304 may include the wireless signal amplifier 500, the antenna 501, and the impedance transformer 502. In addition, the WoC amplifier 106 may include a diplexer 550, which may have a high-pass terminal and a low-pass terminal, as indicated, as well as a common terminal. The low-pass terminal may be coupled to a modem port 552, which may be connected directly or via (e.g., a coaxial) cable to the modem 102. The high-pass filter may be coupled to the impedance transformer 502. The common terminal may be coupled to a downstream port 554, which is in turn coupled to the WoC splitter 302.

Thus, the diplexer 550 may combine low-frequency CATV signals from the modem 102 with high-frequency wireless frequency band signals from the wireless signal amplifier 502, and provide the combination thereof to the WoC splitter 302. Further, the diplexer 550 may block the relatively high frequency wireless frequency band signals from being transmitted to the modem 102 over the coaxial cable, while blocking the CATV signals from being received at the antenna 501. Accordingly, the WoC amplifier 106 of FIG. 5B may pass both downstream wireless frequency band and CATV signals to the WoC splitter 302, while passing upstream wireless frequency band signals to the modem 102 only via the antenna 501, and passing upstream CATV signals only to the modem 102 via the cable coupled to the modem port 552.

Figure 6A:
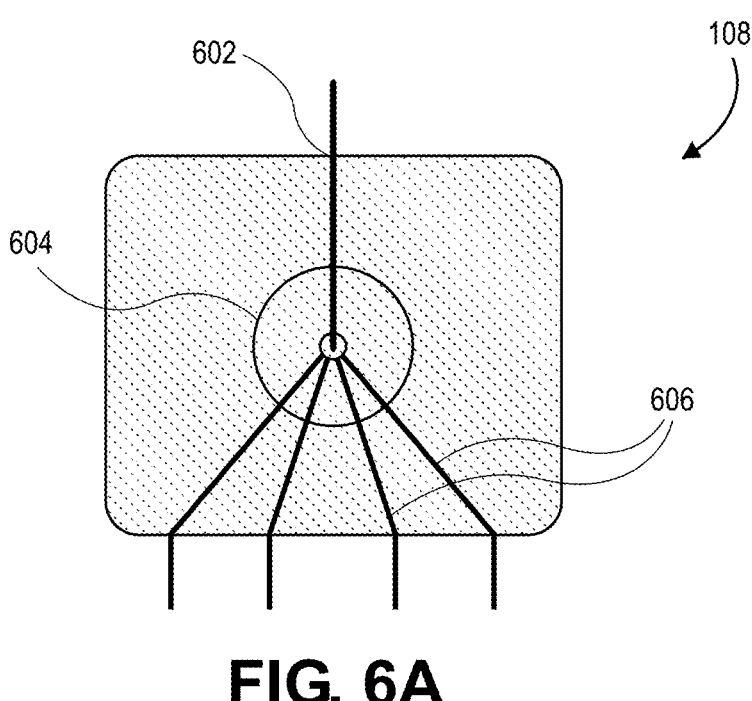
FIGS. 6A, 6B, 6C, 6D, and 6E each illustrate a schematic view of a wireless over cable splitter, according to an embodiment.

FIG. 6A illustrates a schematic view of the WoC splitter 108, e.g., of the systems 100 and 200, shown in and discussed above with reference to FIGS. 1 and 2. The WoC splitter 108 may be configured to send and receive only wireless frequency band signals. Accordingly, the WoC splitter 108 may include an input 602, a splitter 604, and a plurality of output legs 606. The splitter 604 splits signals received from the input 602 into a plurality of lower-strength copies received at each of the output legs 606. The splitter 604 also combines signals received in an upstream direction via the legs 606 and provides the signals to the input 602. Further, the splitter 604 may allow for communication between the legs 606.

Figure 6B:
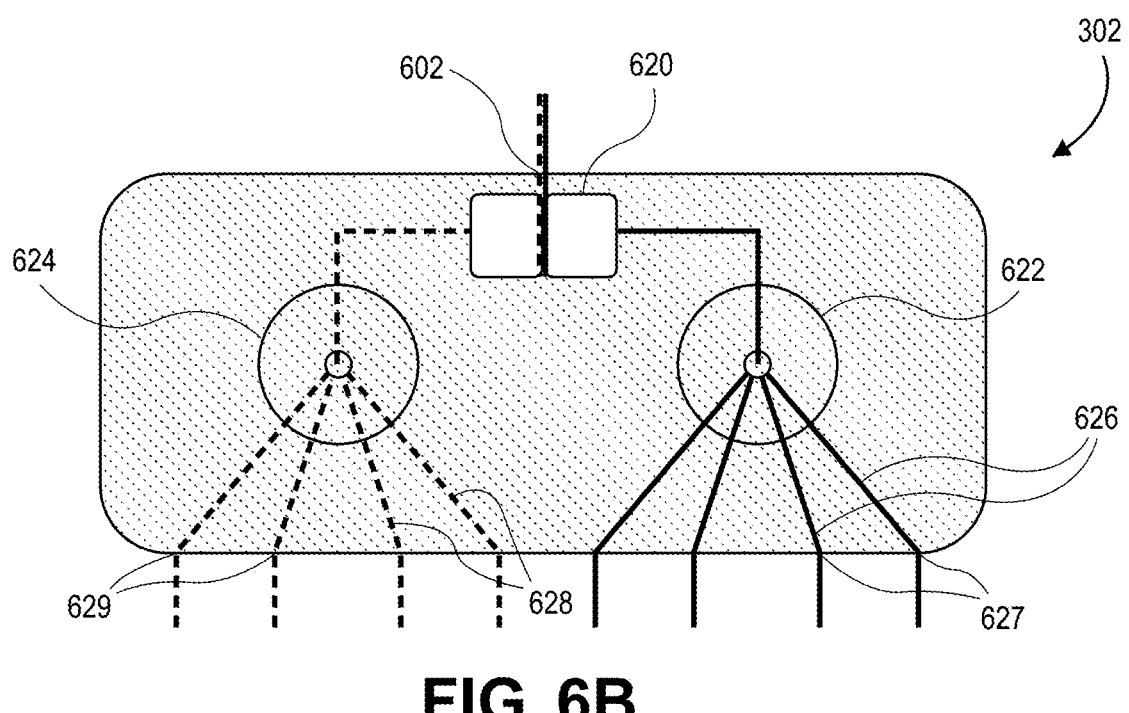

FIG. 6B illustrates a schematic view of the WoC splitter 302, according to an embodiment. The WoC splitter 302 may be configured to send and receive wireless frequency band signals and CATV signals, which may be separated based on frequency by a frequency band separation device 620, such as a diplexer, directional coupler, or the like. The WoC splitter 302 may also include two splitters 622, 624, one for wireless frequency band signals and one for CATV signals. The WoC splitter 302 may also include a plurality of wireless frequency legs 626 (four shown) connected to a plurality of wireless frequency output ports 627 and a plurality of CATV legs 628 (four shown) connected to a plurality of CATV output ports 629. The WoC splitter 302 may thus receive a signal including both wireless and CATV frequency-band signals, and, using the frequency band separation device 620, separate the signals based on frequency. The wireless frequency band signals may be sent to the splitter 622, and the CATV signals may be sent to the splitter 624. The wireless frequency band signals may then be split and lower-strength copies thereof sent to the wireless frequency legs 626, and the CATV signals may be split and lower-strength copies thereof sent to the CATV legs 628. It will be appreciated that upstream signals may be received by the appropriate splitters 622, 624, combined, and sent back to the diplexer 620. The diplexer 620 may then combine such upstream signals and the upstream signals may continue through the input port 602.

Figure 6C:
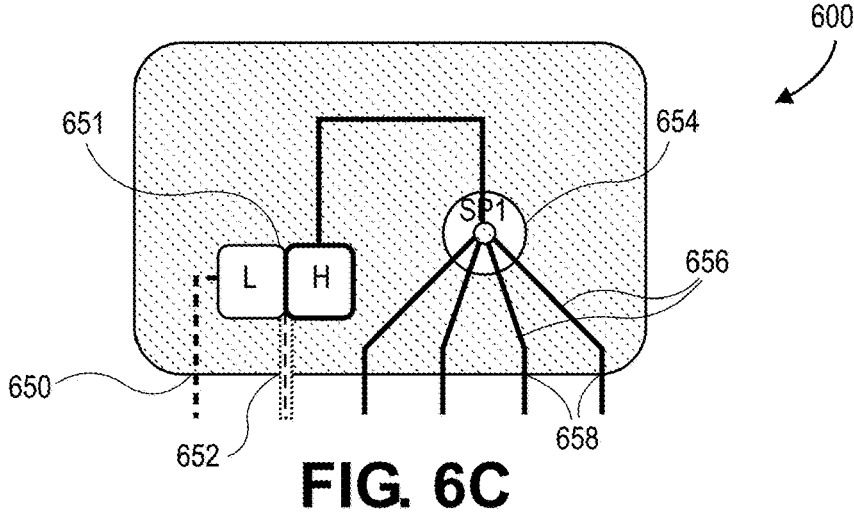

FIG. 6C illustrates a schematic view of a WoC splitter 600, e.g., which may provide the WoC splitter 302 and/or 401 of the systems 300, 400, discussed above, according to an embodiment. As shown, the WoC splitter 600 may include an input port 650, a frequency band separation device (e.g., a diplexer and/or a couplers) 651, an integrated (e.g., CATV/MoCA) port 652, a splitter 654, a plurality of wireless frequency legs 656, and a plurality of wireless frequency ports 658. The input port 650 may be coupled to the low-pass terminal of the diplexer 651. The integrated port 652 may be coupled to the common terminal of the frequency band separation device 651. The splitter 654 may be coupled to the high-pass terminal of a frequency band separation device 651.

Accordingly, downstream CATV signals may be received via the integrated port 652 and provided to the input port 650 and prevented from reaching the splitter 654. Downstream wireless frequency band signals may be received via the integrated port 652 and passed to the splitter 654 via the high-pass terminal of the frequency band separation device 651. The splitter 654 may split the wireless frequency band signals and distribute copies thereof to the legs 656. Upstream wireless frequency band signals may be received through the wireless frequency ports 658, combined at the splitter 654, provided to the integrated port 652 via the high-pass and common terminals of the frequency band separation device 651, and blocked from reaching the input port 650 by the frequency band separation device 651.

Figure 6D:
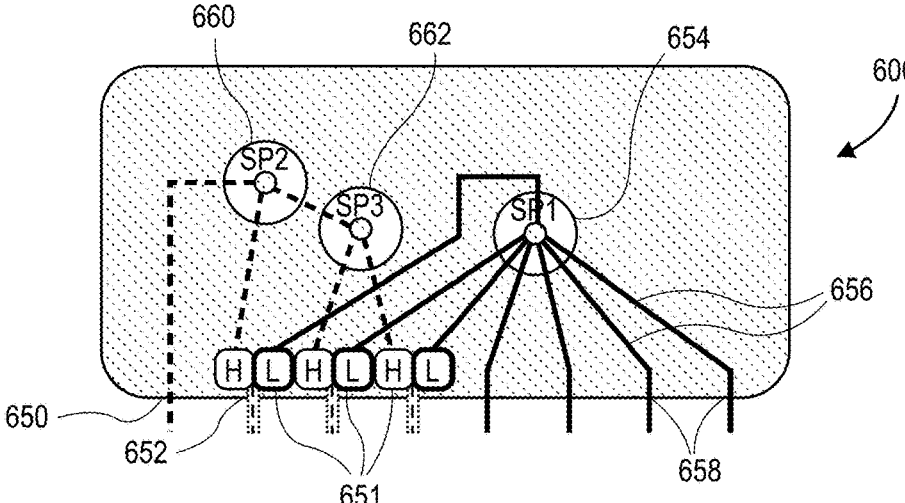

FIG. 6D illustrates a schematic view of another embodiment of the WoC splitter 600. In this embodiment, the frequency band separation device of the WoC splitter 600 may include a plurality of the frequency band separation device 651, and the WoC splitter 600 may include a plurality of the integrated ports 652 connected thereto. The common terminal of each of the frequency band separation devices 651 (e.g., diplex filter or directional coupler circuits) is coupled to one of the integrated ports 652. Further, one or more (e.g., two) CATV signal splitters 660, 662 split the downstream CATV signals received at the input port 650 and provide the low pass terminal of each of the frequency band separation device 651 with a copy of the downstream CATV signal, which then passes to the integrated ports 652.

Figure 6E:
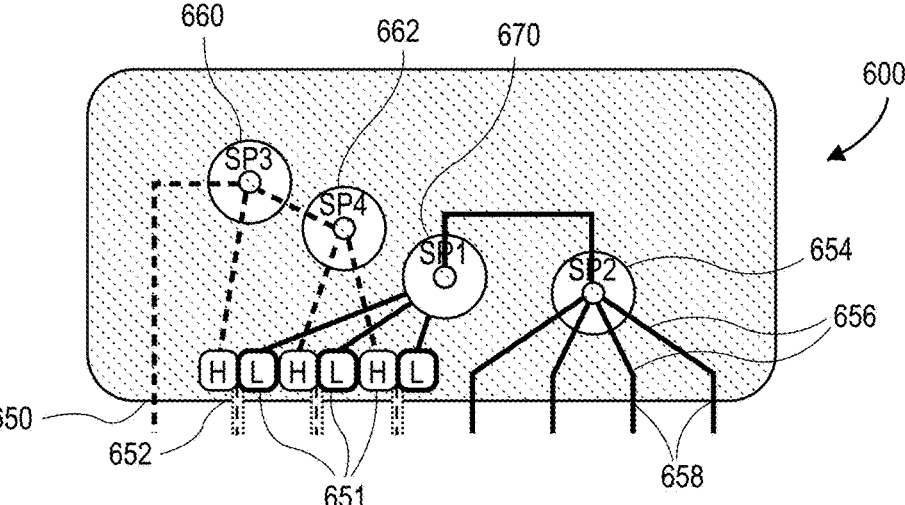
Figure 7A:
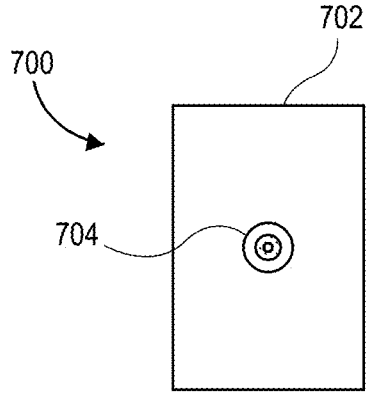
FIGS. 7A, 7B, 7C, and 7D illustrate a wireless over cable adapter assembly, according to an embodiment.
Figure 7B:
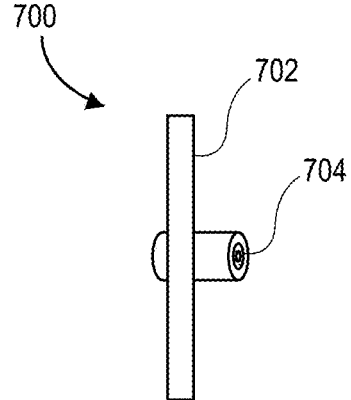
Figure 7C:
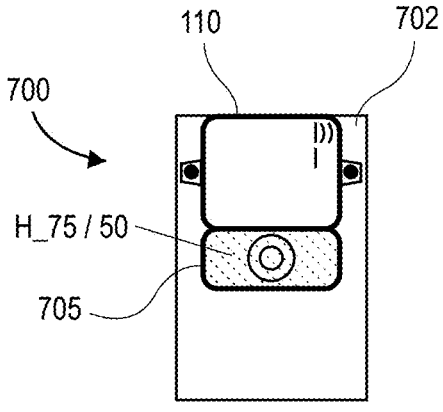
Figure 7D:
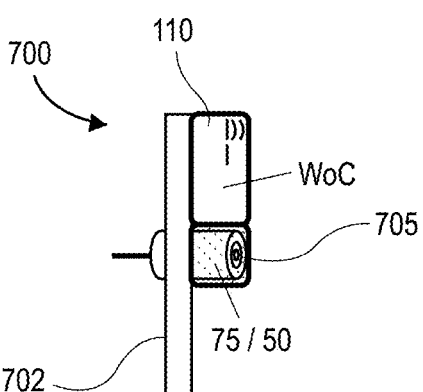
Figure 8A:
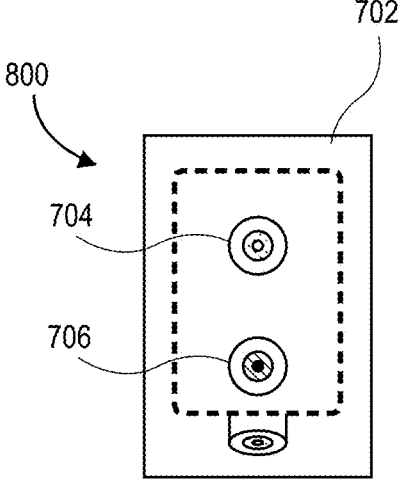
FIGS. 8A, 8B, 8C, and 8D illustrate the wireless over cable adapter assembly, according to another embodiment.
Figure 8B:
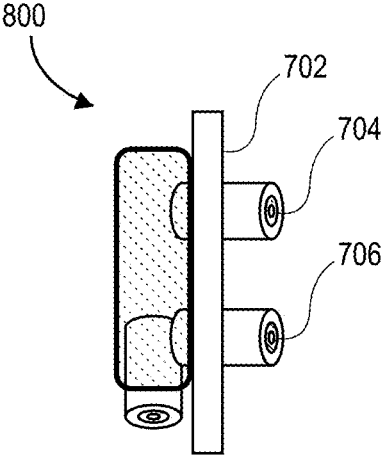
Figure 8C:
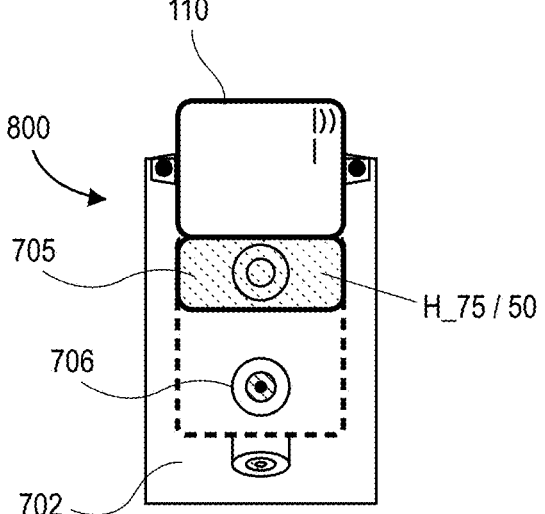
Figure 8D:
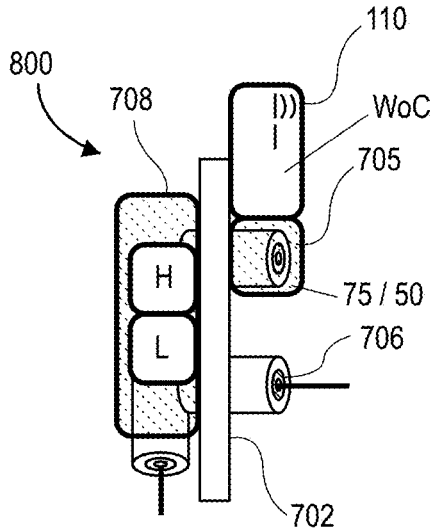

FIG. 6E illustrates a schematic view of another embodiment of the WoC splitter 600. This embodiment may be similar to the embodiment of FIG. 6D, except that a second wireless frequency splitter 670 is provided, which splits a wireless frequency band signal received in an upstream direction at the splitter 654 into two or more copies, which are then provided to the high-pass terminals of the frequency band separation device 651, and then to the integrated outputs 630 via the common terminals of the frequency band separation device 651.

In each of the WoC splitter embodiments provided herein, each of the splitters contained therein may be any one or more of a broad band ferrite splitter, a high-band resistive splitter or a Wilkinson splitter, as appropriate.

FIGS. 7A-7D illustrate an embodiment of a WoC adapter assembly 700. In this embodiment, the assembly 700 may include a wall plate 702 (e.g., the wall plate 410 of FIG. 4), which includes an f-pin connector 704, which may be connected to a coaxial cable connector. The WoC adapter 110 (e.g., FIGS. 1-4) may be connected thereto, e.g., via an impedance transformer 705. The impedance transformer 705 may be a 75/50 ohm Z-match transformer. The WoC adapter 110 may include an antenna, which may be a patch, SMD, or dipole antenna, configured to send and receive wireless frequency band signals.

FIGS. 8A-8D illustrate another embodiment of a WoC adapter assembly 800. In this embodiment, the wall plate 702 may include a second f-pin connector 706 and a frequency band separation device (e.g., a diplexer and/or coupler) 708. The high-pass terminal of the frequency band separation device 708 may be connected to the first connector 704, and the low-pass terminal of the frequency band separation device 708 may be connected to the second connector 706. The common terminal of the frequency band separation device 708 may be connected to the cable extending from the WoC splitter 302 (see, e.g., FIG. 3). Thus, relatively low-frequency CATV and/or MoCA signals may be directed to the second connector 706, and then to any CATV and/or MoCA devices coupled thereto, while relatively high-frequency wireless frequency band signals may be directed to the first connector 706 and then to the WoC adapter 110.

Figure 11A:
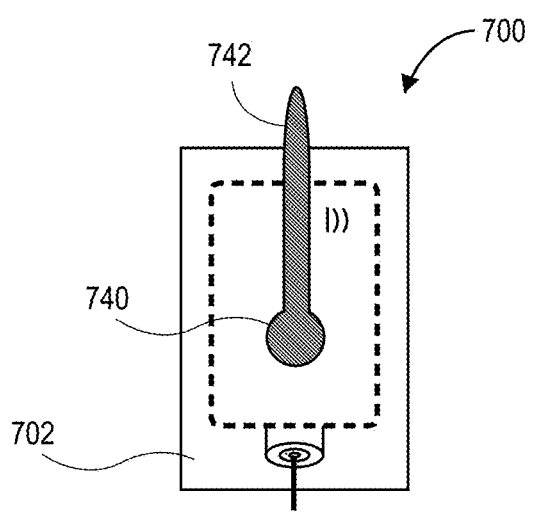
FIGS. 11A and 11B illustrate the wireless over cable adapter assembly, according to another embodiment.
Figure 11B:
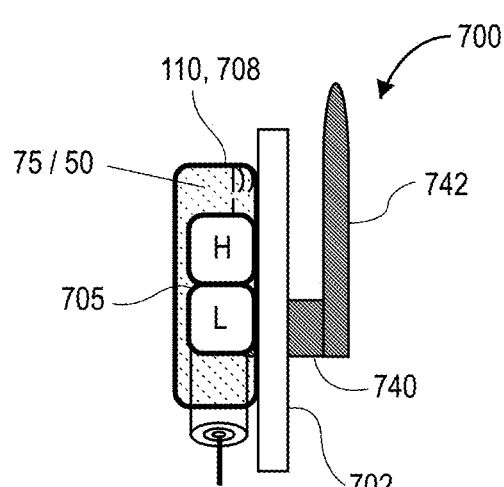

FIG. 9 may be similar to FIGS. 8A-8D, except that the WoC adapter 110 is positioned behind the wall plate 702, e.g., integrated with the frequency band separation device 708 and the impedance transformer 705. As such, the first f-pin connector 704 may be omitted. FIG. 10 may be similar to FIG. 9, except no first connector 704 is provided. FIGS. 11A and 11B may be similar to FIGS. 10A and 10B, except that an antenna port 740 is provided on the outside of the wall plate 702, which is in electrical communication with the WoC adapter 110. An antenna 742 may be connected to the antenna port 740.

Figure 12A:
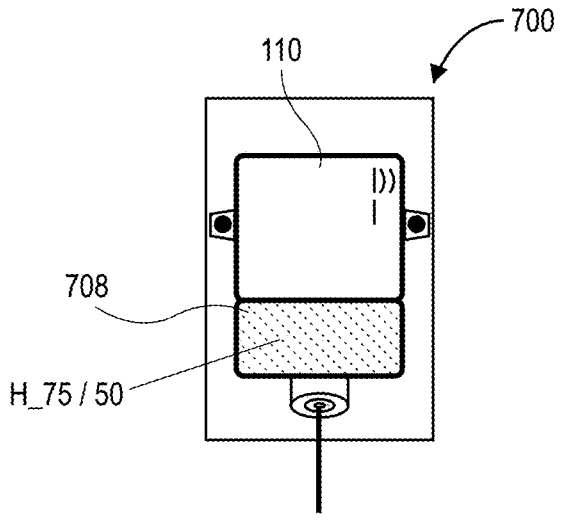
FIGS. 12A and 12B illustrate the wireless over cable adapter assembly, according to another embodiment.
Figure 12B:
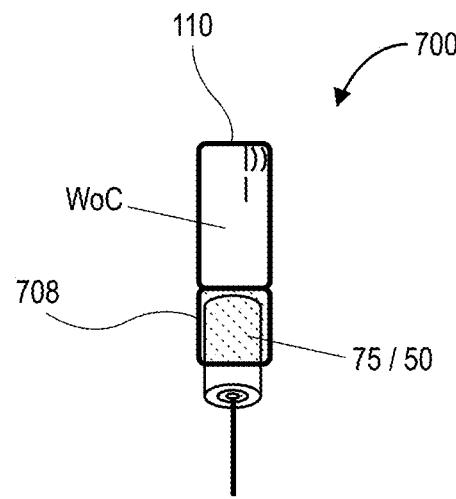
Figure 13:
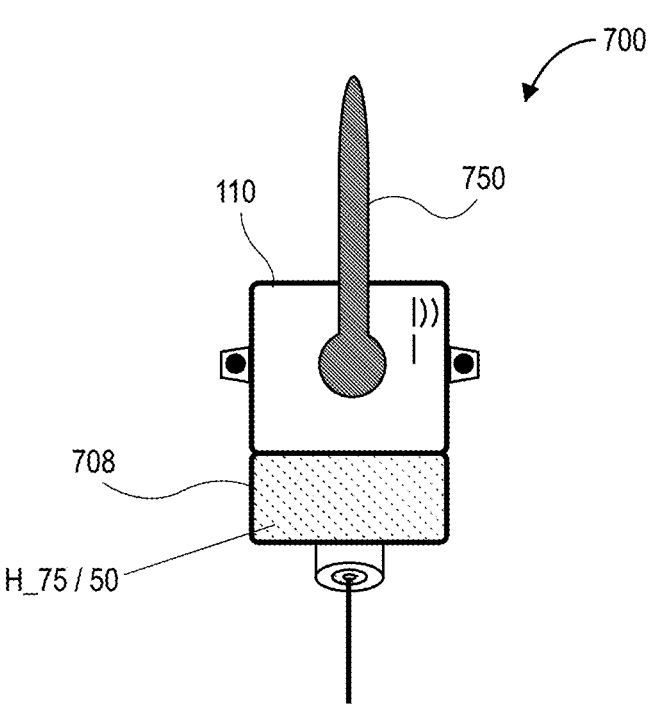
FIG. 13 illustrates a wall-mount embodiment of the wireless over cable adapter assembly.
Figure 14:
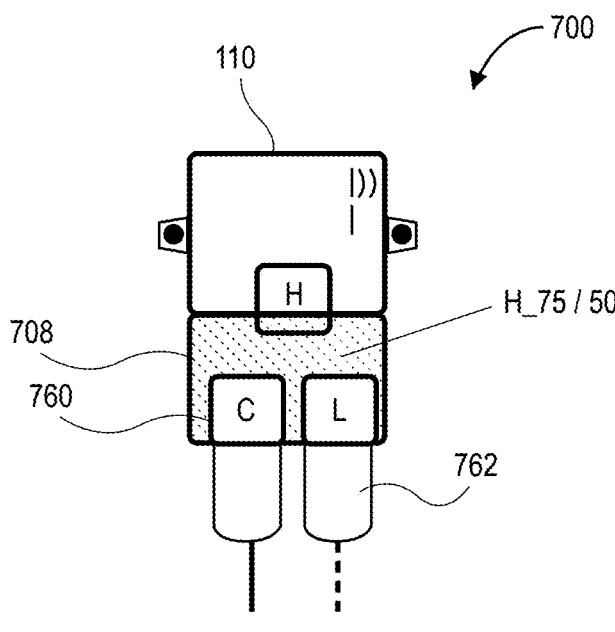
FIG. 14 illustrates another wall-mount embodiment of the wireless over cable adapter assembly.

FIGS. 12A and 12B illustrate a wall-mount version of the WoC adapter assembly 700. In this embodiment, the components of the WoC adapter 110, including the impedance transformer 705, may be attached directly to a wall, rather than to a face plate. As shown in FIG. 13, the WoC adapter assembly 700 may include connectivity for an external antenna 750 to be coupled to the WoC adapter 110 in the wall mount version. Further, as shown in FIG. 14, the wall-mount embodiment of the WoC adapter assembly 700 may include a frequency band separation device 760. A high-pass terminal of the frequency band separation device 760 may be in communication with the WoC adapter 110, the common terminal may be in communication with the WoC splitter 302 (e.g., FIG. 3), and the low-pass terminal may be in communication with a port 762. A wired connection to a CATV and/or a MoCA device may be provided via the port 762.

The foregoing description provides illustration and description, but is not intended to be exhaustive or to limit the possible implementations to the precise form disclosed.

Modifications and variations are possible in light of the above disclosure or may be acquired from practice of the implementations.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

While the present disclosure has been disclosed with respect to a limited number of embodiments, those skilled in the art, having the benefit of this disclosure, will appreciate numerous modifications and variations there from. It is intended that the appended claims cover such modifications and variations as fall within the true spirit and scope of the disclosure.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A system for communicating wireless signals with an extended range over a cable network, comprising:
   a wireless-over-cable splitter configured to communicate external network signals with a service provider network;
   a frequency band separation device configured to separate wireless frequency band signals from the external network signals;
   a wireless-over-cable adapter configured to be electrically connected to the wireless-over-cable splitter;
   a wireless-over-cable amplifier configured to communicate the wireless frequency band signals to and from a modem, the modem being connected to an internet service provider network;
   wherein the wireless-over-cable amplifier includes a wireless signal amplifier configured to be connected with the modem; and
   wherein the wireless-over-cable adapter is configured to transmit the wireless frequency band signals wirelessly such that a range of the wireless frequency band signals is extended.

2. The system of claim 1, wherein the wireless-over-cable amplifier further includes a modem port configured to communicate with the modem, and the frequency band separation device is configured to be electrically connected with the modem port and the output port.

3. The system of claim 2, wherein wireless-over-cable amplifier further includes an antenna configured to be in wireless communication with the modem, and wherein the frequency band separation device is configured to transmit the external network signals between the modem and the wireless-over-cable splitter, transmit the wireless frequency band signals between the antenna and the wireless-over-cable splitter, block the wireless frequency band signals from the wireless-over-cable splitter from being transmitted to the modem port, and block the external network signals from the modem port from being transmitted to the antenna.

4. The system of claim 1, wherein the frequency band separation device comprises a diplexer.

5. The system of claim 1, wherein the frequency band separation device comprises a coupler.

6. The system of claim 1, wherein the wireless-over-cable splitter is configured to separate CATV signals from Multimedia over Coaxial Alliance (MoCA) signals and to separate the CATV signals from the wireless frequency band signals.

7. A system for communicating wireless signals with an extended range over a cable network, comprising:

a wireless-over-cable splitter configured to split received wireless frequency band signals from received external network signals;

a wireless-over-cable amplifier configured to communicate the wireless frequency band signals with a modem that is configured to communicate an external network signal with an external network; and a wireless-over-cable adapter configured to be electrically connected to the wireless-over-cable splitter so as to receive the wireless frequency band signals from the wireless-over-cable splitter and transmit the wireless frequency band signals at least to a wireless communication device such that the wireless frequency band signals have an extended range to the wireless communications device.

8. The system of claim 7, wherein the wireless-over-cable amplifier is configured to communicate the wireless frequency band signals with the modem through at least a wireless communication.

9. The system of claim 7, wherein the wireless-over-cable amplifier is configured to wirelessly communicate the wireless frequency band signals with the modem.

10. The system of claim 7, wherein the wireless-over-cable amplifier is configured to only wirelessly communicate the wireless frequency band signals with the modem.

11. The system of claim 7, wherein the modem and the wireless-over-cable splitter are configured to communicate the external network signal with the external network.

12. The system of claim 7, wherein the wireless-over-cable splitter is configured to communicate the external network signal with the external network.

13. The system of claim 7, wherein the wireless-over-cable splitter is configured to receive the external network signal from either the modem or an internet service provider network, receive internal network signals from an internal network device, and receive the wireless frequency band signal from the wireless-over-cable amplifier.

14. The system of claim 7, further comprising a wireless-over-cable adapter assembly that includes the wireless-over-cable adapter.

15. A system for communicating wireless signals with an extended range over a cable network having a splitter, comprising:

a wireless-over-cable device configured to be connected to an external network and communicate external network signals and wireless frequency band signals therewith and to communicate the wireless frequency band signals with an adapter;

an amplifier configured to wirelessly communicate the wireless frequency band signals to and from a modem; and wherein the adapter is configured to receive the wireless frequency band signals and transmit the wireless frequency band signals wirelessly such that a range of the wireless frequency band signals is extended.

\* \* \* \* \*